R. E. HELLMUND.
SYSTEM OF CONTROL.
APPLICATION FILED MAR. 8, 1917.
1,376,431.
Patented May 3, 1921.
2 SHEETS—SHEET 2.
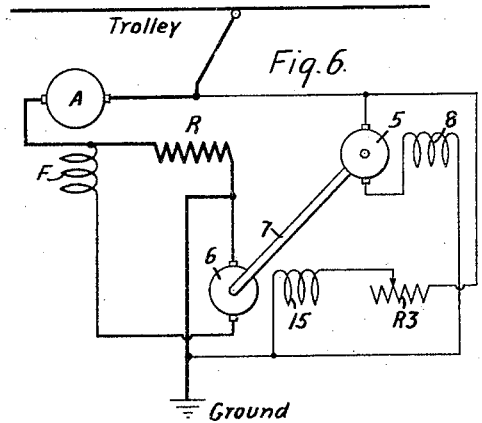
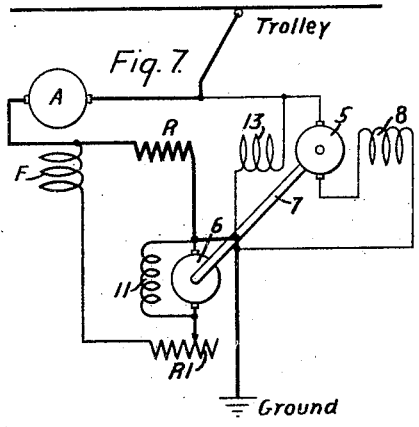
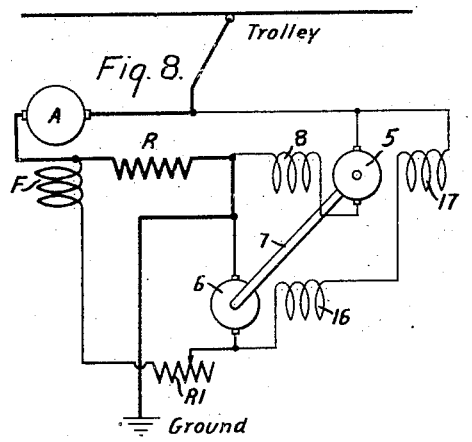
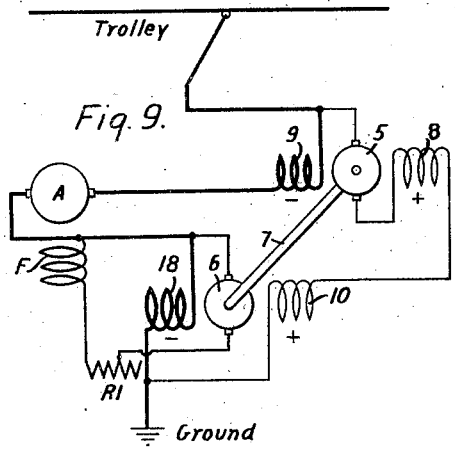
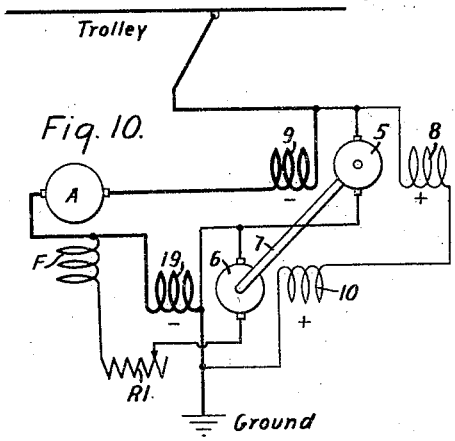
WITNESSES:
Fred. A. Lind.
W. R. Coley
INVENTOR
Rudolf E. Hellmund
BY
Charles Sloan
ATTORNEY

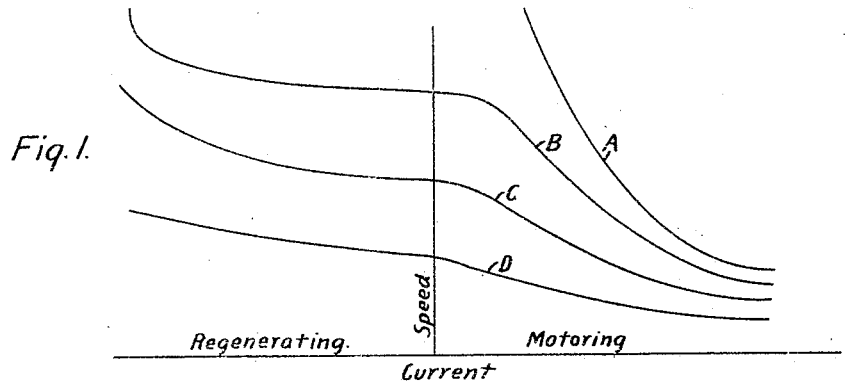
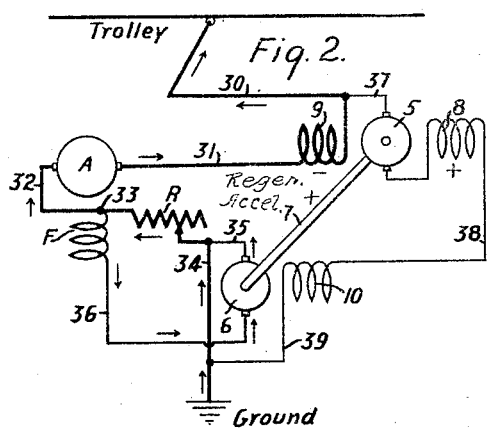
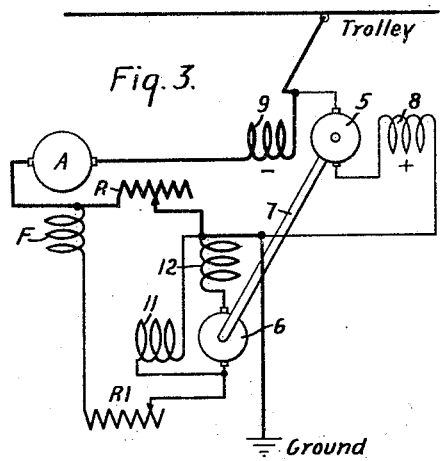
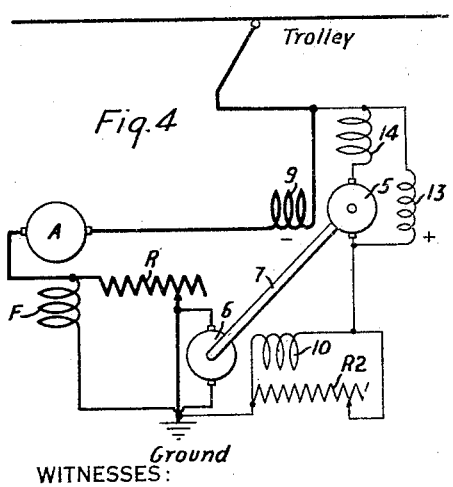
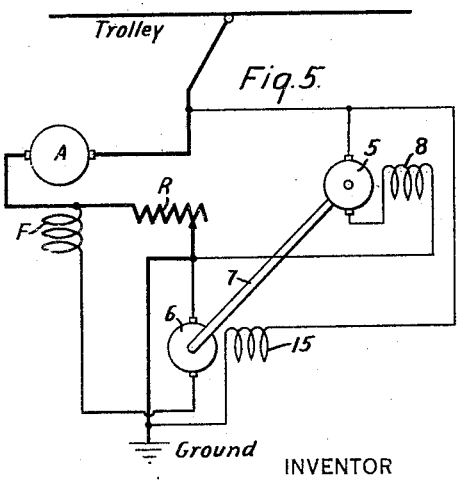

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,376,431.      Specification of Letters Patent.      Patented May 3, 1921.

Application filed March 8, 1917. Serial No. 153,285.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to governing means for dynamo-electric machines that are adapted for both accelerating and regenerative operation.

The object of my invention is to provide a system of the above-indicated character embodying exciter means of the dynamo-electric-machine type that is inherently adapted to cause the main machine to operate in accordance with continuous speed-current curves throughout the range of regeneration and acceleration, the curves being always drooping but being relatively flat when approaching the zero load line from the regenerative side and becoming steeper after reaching the motoring side.

In another aspect, it is the object of my present invention to provide various relatively simple and effective control systems for automatically performing the above-mentioned function in accordance with the reversal of main-current flow that occurs when the main machine changes from a generator to a motor or vice versa.

My invention may best be understood by reference to the accompanying drawings, wherein Figure 1 is a curve chart illustrating certain operating characteristics of machines governed in accordance with my present invention, and Fig. 2 to Fig. 10, inclusive, are diagrammatic views of various circuit connections and arrangements for automatically and inherently producing, in the machines, operating characteristics similar to those shown in Fig. 1.

In my co-pending application, Serial No. 44,443, filed August 9, 1915, patented Apr. 1, 1919, No. 1,298,706, is shown and described a regenerative control system of the general type to which my present invention appertains. However, under certain special conditions, such as the operation of a relatively light-weight railway vehicle down grades of a certain steepness, it has been found that the use of the system in question reduces the speed of the vehicle more than is desirable or necessary under the assumed conditions. The reason for such action is that, obviously, the speed at light regenerative loads must be low if the speed-current-curves for regenerative operation are made relatively steep. If, on the other hand, relatively "flat" speed-current curves over the entire range of possible operating conditions were used, a relatively small change in vehicle speed or line voltage would cause a large variation of armature current, and thus produce excessive armature currents and undesirably high ratios of armature ampere-turns to field-winding ampere-turns during motor operation and lead to relatively high voltage between commutator segments with resultant liability to "flash-over" difficulties.

To overcome the trouble in question, it is desirable to provide the main machines with speed-current characteristics of the type shown by B, C and D in Fig. 1, wherein the portion of the curves corresponding to regenerative operation is materially "flatter" or more horizontal, on the average, than is the portion of the corresponding curve representing accelerating or motor operation. Thus, the "flatness" of the curve during the regenerative period permits operation under light-load conditions at relatively high speeds whereas, as soon as the main current reverses to cause the main machine to act as a motor, the characteristic curves become steeper and thus prevent the above-mentioned excessive motor currents and "flash-over" difficulties.

Referring to Fig. 2, the system shown comprises suitable supply-circuit conductors respectively marked "Trolley" and "Ground"; a main dynamo-electric machine having an armature A and a field winding F of the series type; a main-circuit variable resistor R; and an auxiliary motor-generator set embodying a motor or driving armature 5 and a generator or driven armature 6 that is mechanically connected to the driving armature 5 in any suitable manner, as by a shaft 7.

The armature 5 is driven from the supply circuit and is provided with a field winding 8 that is uni-directionally excited at all times, in this case being connected in series relation with the armature 5, while a second field winding 9 that is energized in accordance with the main-armature current is also provided for the armature 5. The arrangement and proportion of parts is such that during regenerative operation of the main machine, the field winding 9 acts differentially with respect to the allied field winding 8 to thus cause corresponding variations of the auxiliary-machine speed in accordance with the changes of main-machine current; whereas, during accelerating or motor operation of the main machine, the auxiliary field windings 9 and 8 are cumulatively related by reason of the reversal of current through the field winding 9, but a substantially constant auxiliary-machine speed is maintained under accelerating conditions by reason of the fact that such cumulative action of the field windings causes a relatively high degree of saturation in the supply-circuit-driven armature 5 and thus but little effect is produced with respect to auxiliary-machine-speed changes as the main-machine current varies.

The other auxiliary armature 6 is connected to excite the main field winding F through the resistor R and is, in this case, provided with a field winding 10 that is connected in series relation to the auxiliary motor armature 5.

Assuming that regenerative operation of the main machine has been effected in any suitable manner, which need not be described here, the main circuit is established from the ground through conductor 34, resistor R, which is suitably varied to compensate for the gradual decrease of main-machine speed, junction-point 23, conductor 32, main armature A, conductor 31, auxiliary field winding 9, and conductor 30 to the trolley.

A second circuit is completed from one terminal of the auxiliary exciting armature 6 through conductor 35, the resistor R, main field winding F and conductor 36 to the opposite terminal of the exciting armature.

An auxiliary circuit is completed from the positively energized conductor 30, through conductor 37, auxiliary motor armature 5, field winding 8 therefor, conductor 38, field winding 10 for the exciting armature 6 and conductor 39 to ground.

As indicated by the plus and minus signs, the auxiliary field winding 9 acts differentially with respect to the allied field winding 8 under the assumed regenerative conditions. Furthermore, as indicated by the arrows, the main-armature or regenerative current traverses the resistor R in the same direction as the main-field-winding current from the exciting armature 6. Thus, in case of an incipient increase of regenerative current, the voltage drop across the resistor R is immediately and correspondingly increased to thereby reduce the voltage that is delivered by the exciting armature 6 to the main field winding F to effect a reduction of the main-field-winding excitation and, therefore, of the main-armature current. The converse action occurs in the case of an incipient decrease of regenerative current. Inasmuch as such operation is fully set forth and claimed in my above cited co-pending application, no further discussion thereof is deemed to be necessary at present, since it will be understood from the foregoing remarks that the resistor R automatically functions to prevent relatively great surges or variations of main-armature current.

Again, assuming an increase of main-armature current, the opposing excitation produced by the auxiliary field winding 9 is correspondingly augmented to thereby effect an increase in the speed of the motor-generator set, in accordance with familiar principles, by reason of the reduction of the total effective field-winding excitation for the auxiliary motor armature 5. Such increase of auxiliary-machine speed increases the voltage of the exciting armature 6 to thereby counter-balance the above-mentioned regulating effect of the resistor R to a predetermined degree in such manner that the main machine tends to operate in accordance with the relatively flat or regenerative portions of the curves shown in Fig. 1. It is evident that, when operating with a flat curve of the character in question, the speed remains high under light-load conditions. Thus, relatively high regenerative speeds are permitted without the sacrifice of other advantages or any danger of injury to the regenerative equipment.

If, for any reason, such as the vehicle encountering an up-grade, the regenerative action should cease and a reversed or motor current should thereby flow through the main armature A and the auxiliary field winding 9, the effect of such field winding becomes positive or cumulative with respect to the action of the allied field winding 8 and thus produces a relatively strong excitation of the auxiliary motor armature 5. Such increase of flux in the magnetic circuit of the armature 5 produces a relatively high degree of saturation by reason of the above-described proportion of parts and thus, the auxiliary-machine speed is maintained substantially constant, irrespective of variations of main-machine current. In this way the full effect of the resistor R is available to produce the desired relatively steep curves that are illustrated in the right-hand or motoring portion of Fig. 1.

Fig. 3 does not differ essentially from Fig. 2, the only changes being the substitution of a shunt field winding 11 and a compensating series field winding 12 for the auxiliary generator field winding 10 and the insertion of a variable resistor R1 in circuit with the exciting armature 6 and the main field winding F to aid in manually compensating for changes in main-machine speed.

Similarly, in Fig. 4, a shunt field winding 13 and a compensating series field winding 14 are employed in lieu of the series-related auxiliary motor field winding 8, and a variable resistor R2 is connected in parallel relation to the auxiliary generator field winding 10.

Each of the modifications just outlined has certain operating advantages, and it is evident that other variations of the circuits shown may be made to better accord with any particular service conditions.

Fig. 3 has the advantage over Fig. 2 that the field winding 9 can be made smaller because the desired effect is partly accomplished by the action of field windings 8 and 11. As pointed out in connection with Fig. 2, an increased regenerative current decreases the main-machine exciting current. This, in turn, reduces the exciter load and, hence, the current in field winding 8. Thus, the motor speeds up, even without the effect of field winding 9 and thereby increases the voltage of the shunt-excited exciter, partly compensating for the reducing effect which the resistance R has upon the field of the exciter. This causes, in itself, a flattening of the regenerative curve, so that the effect of field winding 9 can be made smaller than in the system of Fig. 2.

On the other hand, when motoring, changes in either field winding 8 or 9 will have little effect upon the speed of the motor-generator set because of the saturated condition of the field magnetic circuit of the auxiliary motor, so that the resistance R can produce a steep main-machine characteristic. The use of the resistor R1 increases the regulating possibilities.

Fig. 4 is advantageous over Fig. 2 in cases where it is desirable to reduce the losses in the resistor R to a minimum. Without the action of field winding 9, this system is adapted to produce a steep main-machine-characteristic curve with small value of the resistor R. Field winding 9 acts, as in the system of Fig. 2, to flatten such characteristic curve during regeneration.

An inherent regulating result similar to that hereinbefore set forth may be obtained by the omission of the main-circuit-energized field winding 9 of Fig. 2, provided armature 6 is separately excited, as illustrated in Fig. 5. Under such circumstances, the inherent counteracting effect of the main-circuit resistor R is partially offset, as already explained in connection with Fig. 3, since an incipient decrease of main-field-winding current is accompanied by a decrease of the current traversing the exciting armature 6 and the consequent reduction of driving-energy requirements for the auxiliary motor armature 5 produces an increase of auxiliary-machine speed. Such speed increase, in turn, effects an increase in the voltage of the exciting armature which is excited from the supply circuit by a shunt field winding 15 and the excitation whereof, consequently, does not vary in accordance with changes of main-armature current. Thus, the design of parts may be made such as to inherently counteract, to any desired degree, the regulating effect of the resistor R during the regenerative period to produce the desired relatively flat speed-current operating curves.

The only difference in Fig. 6, resides in the employment of a variable resistor R3 in circuit with the auxiliary generator field winding 15 to adjust the exciter voltage and thus compensate for the decrease in main-machine speed during the regenerative period.

In Fig. 7, the auxiliary motor armature 5 is again provided with the series-related field winding 8 and, in addition, with the shunt field winding 13, which is connected directly across the supply circuit. For relatively light loads, the shunt field winding 13 will predominate, while under other conditions, either of the field windings 8 and 13 may be the stronger. The auxiliary exciting armature 6 is provided with the shunt field winding 11 and the main-field-winding-circuit resistor R1 may also be utilized. Under such conditions, the degree of counteracting effect of the inherent regulating action produced by the main-circuit resistor R may be made smaller than is the case in the system of Fig. 6, by reason of the different degree of speed change in the auxiliary machines that is caused by the provision of the compound field windings for the auxiliary motor armature 5.

In Fig. 8, the main-circuit resistor R and the main-field-winding-circuit resistor R1 are provided in connection with the main machine and the exciting armature 6 which, in this case, is supplied with a shunt field winding 16 that is connected in series relation with a shunt field winding 17 for the auxiliary motor armature 5, the two field windings just recited being connected between the trolley and the lower-voltage terminal of the exciting armature 6. The auxiliary motor armature 5 is also provided with the series-related field winding 8. With the field winding arrangements just described, the desired inherent operating characteristics of the momentum-driven main machines are provided, but, by reason of the series connection of the auxiliary field windings 16 and 17, a larger gage of wire may be employed than is possible in the system of Fig. 7, thereby providing, in this respect, a more rugged and durable system, which may be necessary under certain operating conditions. For relatively light loads, the shunt field winding 17 will predominate, while under other conditions, either of the field windings 8 and 17 may be the stronger.

In the system shown in Fig. 9, the main-circuit resistor R is omitted and, in addition to the field windings 8 and 9 for the auxiliary motor armature 5 and the field winding 10 for the exciting armature 6, a second field winding 18 therefor is provided, being connected between the higher-voltage terminal of the exciting armature and the negative supply-circuit conductor ground, thus being energized in accordance with the main-armature current. The arrangement of field windings is such that a differential relation exists between the allied field windings 8 and 9 and also between the corresponding field windings 10 and 18 under regenerative conditions and, moreover, the proportion of parts is such that the negative effect of the field winding 18 upon the exciting armature 6 is slightly greater than that of the field winding 9 upon the auxiliary motor armature 5.

Consequently, upon an incipient increase of regenerative current, the speed of the auxiliary machines is increased, while the strengthening of the auxiliary generator field winding 18 effects a decrease of the electromotive force delivered by the exciting armature 6, by reason of the differential connection of the field winding 18 with respect to the allied field winding 10. In this way, a reduction of main-field-winding-voltage is produced to cause the main armature current to recede to the desired normal value. The converse action, of course, takes place upon an incipient decrease of regenerative current. In either case, the arrangement of parts is such that the desired relatively "flat" speed-current characteristics for the main machine are obtained.

Under motoring conditions, when the current traversing the main armature A and the auxiliary field windings 9 and 18 is reversed, the exciting action of such field windings becomes cumulative with respect to the allied field windings 8 and 10, respectively, but, by reason of the relatively high saturation that is thereby produced in the magnetic circuit of the auxiliary armature 5, as previously described in connection with Fig. 1, a substantially constant auxiliary-machine speed is maintained. On the other hand, the positive action of the auxiliary generator field winding 18 is fully effective since the magnetic circuit of the generator is of sufficiently liberal portions to prevent saturation under such conditions.

With reference to Fig. 10, a differentially-acting field winding 19, that is connected in circuit in the same position as the main resistor R of previous figures, is substituted for the auxiliary generator field winding 18. Thus, the field winding 19 carries both the main-armature current and the main-field-winding current that is furnished by the exciting armature 6. In the present case, the regenerative operation of the system is similar to that set forth in connection with Fig. 9, while, under most accelerating conditions, the field winding 19 still produces a differential effect with respect to the allied field winding 10, since the current delivered by the exciting armature 6 predominates over the reversed main-armature or accelerating current for most loads.

In the systems of either Fig. 9 or Fig. 10, however, the action of the auxiliary motor armature 5 is sufficient, under all operating conditions, to produce the desired effect of operating the main machine during regeneration and acceleration in accordance with the curves shown in Fig. 1. The resistance of the field winding 19 has the previously-described effect of the resistor R and simply increases effect of the field winding 19 as a negative compound winding.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a dynamo-electric machine adapted for both accelerating and regenerative operation, of means including auxiliary dynamo-electric exciter means having field windings responsive to the machine current for inherently causing said machine to operate in accordance with "flatter" speed-current curves during regeneration than during acceleration.

2. In a system of control, the combination with a supply circuit and a dynamo-electric machine adapted for both accelerating and regenerative operation, of a plurality of auxiliary mechanically connected armatures respectively driven from the supply circuit and connected to excite the main field winding, and an arrangement of field windings for said auxiliary armatures dependent upon the flow of accelerating or regenerative current in the main machine for causing said machine to operate in accordance with materially different characteristics.

3. In a system of control, the combination with a supply circuit and a dynamo-electric machine adapted for both accelerating and regenerative operation, of a plurality of auxiliary mechanically connected armatures respectively driven from the supply circuit and connected to excite the main field winding, and an arrangement of field windings for said auxiliary armatures dependent upon the flow of accelerating or regenerative current in the main machine for inherently causing said machine to operate in accordance with "flatter" speed-current curves during one type of operation than during the other.

4. In a system of control, the combination with a supply circuit and a dynamo-electric machine adapted for both accelerating and regenerative operation, of a plurality of auxiliary mechanically connected armatures respectively driven from the supply circuit and connected to excite the main field winding, and an arrangement of field windings for said auxiliary armatures dependent upon the flow of accelerating or regenerative current in the main machine for inherently causing said machine to operate in accordance with "flatter" speed-current curves during regeneration than during acceleration.

5. In a system of control, the combination with a supply circuit and a dynamo-electric machine adapted for both accelerating and regenerative operation, of a plurality of auxiliary mechanically connected armatures respectively driven from the supply circuit and connected to excite the main field winding, a field winding of uni-directional excitation and a second field winding energized in accordance with the main-armature current, for the supply-circuit-driven auxiliary armature, said auxiliary field windings being arranged to act differentially during regeneration to effect variations of auxiliary-machine speed and to act cumulatively during acceleration to highly saturate the corresponding magnetic circuit and maintain a substantially constant auxiliary machine speed.

6. In a system of control, the combination with a supply circuit and a dynamo-electric machine adapted for both accelerating and regenerative operation, of a resistor connected in series relation with the main armature across the supply circuit, a plurality of auxiliary mechanically connected armatures respectively driven from the supply circuit and connected to excite the main field winding through said resistor, a field winding of uni-directional excitation and a second field winding energized in accordance with the main-armature current, for the supply-circuit-driven auxiliary armature, said auxiliary field windings being arranged to act differentially during regeneration to effect variations of auxiliary-machine speed and to act cumulatively during acceleration to highly saturate the corresponding magnetic circuit and maintain a substantially constant auxiliary machine speed.

In testimony whereof, I have hereunto subscribed my name this 28th day of Feb., 1917.

RUDOLF E. HELLMUND.